(12) United States Patent
Hayashi et al.

(10) Patent No.: US 9,421,499 B2
(45) Date of Patent: *Aug. 23, 2016

(54) MICROPOROUS MODIFIED-POLYTETRAFLUORO-ETHYLENE MEMBRANE, POROUS-MODIFIED-POLYTETRA-FLUOROETHYLENE-MEMBRANE COMPOSITE AND PRODUCTION PROCESS THEREOF, AND SEPARATION MEMBRANE ELEMENT

(71) Applicant: SUMITOMO ELECTRIC FINE POLYMER, INC., Sennan-gun, Osaka (JP)

(72) Inventors: Fumihiro Hayashi, Osaka (JP); Aya Oya, Osaka (JP); Atsushi Uno, Osaka (JP)

(73) Assignee: SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 435 days.

This patent is subject to a terminal disclaimer.

(21) Appl. No.: 14/118,958

(22) PCT Filed: Jan. 21, 2013

(86) PCT No.: PCT/JP2013/051033
§ 371 (c)(1),
(2) Date: Nov. 20, 2013

(87) PCT Pub. No.: WO2013/111690
PCT Pub. Date: Aug. 1, 2013

(65) Prior Publication Data
US 2014/0083929 A1 Mar. 27, 2014

(30) Foreign Application Priority Data
Jan. 27, 2012 (JP) ................................ 2012-014724

(51) Int. Cl.
*B01D 71/32* (2006.01)
*B01D 69/10* (2006.01)
(Continued)

(52) U.S. Cl.
CPC .......... *B01D 67/0018* (2013.01); *B01D 67/002* (2013.01); *B01D 67/0027* (2013.01);
(Continued)

(58) Field of Classification Search
CPC .......... B01D 67/0013; B01D 67/0018; B01D 67/0027; B01D 69/10; B01D 69/105; B01D 69/12; B01D 69/122; B01D 71/32; B01D 71/36; B01D 71/76; B01D 2325/02
See application file for complete search history.

(56) References Cited

U.S. PATENT DOCUMENTS 3,297,484 A 1/1967 Niedrach
4,340,384 A 7/1982 Nomi
(Continued)

FOREIGN PATENT DOCUMENTS

CN 1180364 A 4/1998
CN 1537150 A 10/2004
(Continued)

OTHER PUBLICATIONS

"PTFE, FEP, and PFA Specifications", Boedeker Plastics, Inc., 2016, 2 pages. Retrieved from http://www.boedeker.com/feppfa_p.htm on Mar. 24, 2016.*
(Continued)

*Primary Examiner* — Jason M Greene
(74) *Attorney, Agent, or Firm* — Drinker Biddle & Reath LLP

(57) ABSTRACT

The invention offers a microporous modified-polytetrafluoroethylene membrane that is a microporous membrane having a significantly small pore diameter and narrow pore-diameter distribution and that can remove microscopic foreign particles at high efficiency when used as a filtration membrane. A microporous modified-polytetrafluoroethylene membrane that is a microporous membrane produced by the steps of producing a copolymer of hexafluoropropylene or perfluoroalkyl ether and tetrafluoroethylene having the number of moles not less than 50 times that of the hexafluoropropylene or perfluoroalkyl ether, forming the copolymer into the shape of a membrane, heating the membrane to the melting point of the copolymer or above to bake the copolymer, cooling the obtained baked product, and stretching the baked product and that has a mean flow pore diameter of 30 nm or less; a porous-modified-polytetrafluoroethylene-membrane composite that incorporates the microporous membrane and a production process of the composite; and a separation membrane element incorporating the porous-modified-polytetrafluoroethylene-membrane composite.

6 Claims, 3 Drawing Sheets

(51) Int. Cl.
*B01D 67/00* (2006.01)
*B01D 69/12* (2006.01)
*B01D 71/76* (2006.01)
*B01D 71/36* (2006.01)

(52) U.S. Cl.
CPC ........... *B01D69/10* (2013.01); *B01D 69/12* (2013.01); *B01D 71/32* (2013.01); *B01D 71/76* (2013.01); *B01D 71/36* (2013.01); *B01D 2325/02* (2013.01); *B01D 2325/22* (2013.01); *B01D 2325/24* (2013.01); *B01D 2325/30* (2013.01)

(56) References Cited

U.S. PATENT DOCUMENTS

| | | | |
|---|---|---|---|
| 5,143,783 | A | 9/1992 | Shimizu et al. |
| 5,286,568 | A | 2/1994 | Bacino et al. |
| 5,510,176 | A | 4/1996 | Nakamura et al. |
| 5,968,642 | A | 10/1999 | Saito |
| 6,019,920 | A * | 2/2000 | Clough ............ B01D 71/36 264/127 |
| 6,046,271 | A | 4/2000 | Wu et al. |
| 6,143,675 | A | 11/2000 | McCollam et al. |
| RE37,701 | E | 5/2002 | Bahar et al. |
| 6,613,203 | B1 | 9/2003 | Hobson et al. |
| 6,746,587 | B2 | 6/2004 | Saffell et al. |
| 2003/0211264 | A1 | 11/2003 | Farnsworth et al. |
| 2004/0099527 | A1 | 5/2004 | Nakayama |
| 2004/0195173 | A1* | 10/2004 | Huang ............ B01D 69/10 210/490 |
| 2005/0096425 | A1 | 5/2005 | Coates et al. |
| 2006/0233990 | A1 | 10/2006 | Humphrey et al. |
| 2006/0269735 | A1 | 11/2006 | Wang et al. |
| 2009/0202876 | A1 | 8/2009 | Shimamura et al. |
| 2010/0203310 | A1* | 8/2010 | Hayashi ............ B01D 67/0027 428/220 |
| 2010/0258497 | A1* | 10/2010 | Morita ............ B01D 71/36 210/323.2 |
| 2010/0320142 | A1* | 12/2010 | Ge ............ B01D 71/36 210/500.27 |
| 2015/0069675 | A1 | 3/2015 | Hayashi et al. |

FOREIGN PATENT DOCUMENTS

| | | |
|---|---|---|
| CN | 101003588 A | 7/2007 |
| CN | 101759832 A | 6/2010 |
| CN | 101775096 A | 7/2010 |
| CN | 101775097 A | 7/2010 |
| EP | 0 369 466 A2 | 5/1990 |
| EP | 1 652 663 A2 | 5/2006 |
| EP | 2 060 314 A1 | 5/2009 |
| EP | 2 239 044 A1 | 10/2010 |
| EP | 2 837 653 A1 | 2/2015 |
| JP | 53-55379 | 5/1978 |
| JP | 61-16840 | 1/1986 |
| JP | S61-66730 A | 4/1986 |
| JP | H05-32810 A | 2/1993 |
| JP | H08-339809 A | 12/1996 |
| JP | 9-173438 | 7/1997 |
| JP | 9-278927 | 10/1997 |
| JP | 10-323923 | 12/1998 |
| JP | 10-512620 | 12/1998 |
| JP | 11-35716 | 2/1999 |
| JP | 11-501964 | 2/1999 |
| JP | H11-300180 A | 11/1999 |
| JP | 11-349887 A | 12/1999 |
| JP | 2002-177390 A | 6/2002 |
| JP | 2002-301321 A | 10/2002 |
| JP | 2003-128833 | 5/2003 |
| JP | 2005-520002 | 7/2005 |
| JP | 2006-142275 A | 6/2006 |
| JP | 2007-332342 A | 12/2007 |
| JP | 4371176 B2 | 11/2009 |
| JP | 2010-094579 A | 4/2010 |
| JP | 2010-132712 A | 6/2010 |
| JP | 2011-052175 A | 3/2011 |
| WO | WO 97/36953 A1 | 10/1997 |
| WO | WO 2006/043363 A1 | 4/2006 |
| WO | WO 2007/026822 A1 | 3/2007 |
| WO | WO-2008/018400 A1 | 2/2008 |
| WO | WO-2011/152145 A1 | 12/2011 |

OTHER PUBLICATIONS

Notification of Second Office Action from SIPO dated Mar. 7, 2012 (3 pages) and its English-language translation (4 pages).
"Sinter", Merriam Webster, http://www.merriam-webster.com/dictionary/sinter, Aug. 6, 2012.
Extended European Search Report dated Apr. 9, 2013 issued in European Patent Application No. 13156468.4.
U.S. Office Action dated Oct. 2, 2015 that issued in U.S. Appl. No. 14/541,905 including Double Patenting Rejections on pp. 3-5.
Machine translation of JP 05-032810 A, Oct. 17, 2013.

* cited by examiner

MICROPOROUS MODIFIED-POLYTETRAFLUOROETHYLENE MEMBRANE, POROUS-MODIFIED-POLYTETRAFLUORO-ETHYLENE-MEMBRANE COMPOSITE AND PRODUCTION PROCESS THEREOF, AND SEPARATION MEMBRANE ELEMENT

TECHNICAL FIELD

The present invention relates to a microporous modified-polytetrafluoroethylene membrane that is a porous resin membrane made of polytetrafluoroethylene modified by hexafluoropropylene or perfluoroalkyl ether and that has micropores with a uniform pore diameter. The present invention also relates to a porous-modified-polytetrafluoroethylene-membrane composite that incorporates the foregoing microporous membrane and to a production process of the composite. The present invention further relates to a separation membrane element incorporating the foregoing porous-modified-polytetrafluoroethylene-membrane composite.

BACKGROUND ART

A porous resin membrane having microscopic through holes can be produced by stretching a membrane made of fluororesin consisting mainly of polytetrafluoroethylene (hereinafter referred to as PTFE). Formed mainly of PTFE, the porous resin membrane has excellent chemical and heat resistance, so that it is used as a filtration membrane (a filter) for filtering microscopic particles.

As stated in, for example, Patent Literature 1, a porous resin membrane made of PTFE can be produced by the following process. First, an extrusion aid is mixed into a PTFE fine powder. Then, the mixture is paste-extruded to obtain a desired shape. The formed product is heated to attain a semibaked state (a state in which unbaked portions and baked portions are mixed together, the state being produced by melting only part of the formed product). Finally, the processed formed product is stretched to become porous. In the above description, the PTFE fine powder is produced, first, by polymerizing tetrafluoroethylene by using emulsion polymerization or otherwise to form PTFE particles (primary particles) having a diameter of 0.15 to 0.35 µm and, then, by granulating them to achieve a diameter of several hundred to several thousand micrometers. In the process stated in Patent Literature 1, however, PTFE is stretched in a semibaked state, in which the PTFE is not completely melted. Consequently, the process is, basically, powder molding and therefore gaps are present between particles before the stretching. As a result, it is difficult to produce a microporous membrane having a uniform pore diameter.

Patent Literature 2 has disclosed that a thin nonporous fluororesin membrane having few defects such as voids and cracks can be obtained through the following process. First, a fluororesin dispersion produced by dispersing a fluororesin powder such as a PTFE fine powder in a dispersion medium is applied onto a smooth film. Then, the dispersion medium is evaporated, and the fluororesin powder is baked to melt it completely. The literature states that subsequent to the above process, by stretching the thin nonporous fluororesin membrane to render it porous, a thin fluororesin membrane having micropores with a uniform pore diameter, having high porosity, and being free from defects can be obtained and that the thin fluororesin membrane can be favorably used as a filtration membrane for microscopic particles.

In addition, Patent Literature 3 has stated that by bonding a thin fluororesin membrane formed as described above with a stretchable supporter and subsequently by stretching them at lower than 30° C., a thin porous fluororesin membrane can be produced that has microscopic pores capable of removing microscopic particles even the membrane is a thin membrane having a thickness of 50 µm or less and that has high porosity. This process can be applied to the production of, particularly, a thin porous fluororesin membrane having a mean flow pore diameter of 45 nm or less.

CITATION LIST

Patent Literature

Patent Literature 1: the published Japanese patent application Tokukai 2007-332342
Patent Literature 2: the published Japanese patent 4371176
Patent Literature 3: the published Japanese patent application Tokukai 2010-94579

SUMMARY OF INVENTION

Technical Problem

Although the process stated in Patent Literature 2 or 3 or the like enables the production of a microporous membrane for filtering microscopic particles, the market has been requiring a thin porous fluororesin membrane (a microporous membrane) having a more microscopic pore diameter for efficiently filtering more microscopic particles. Furthermore, the market has been requiring a microporous membrane having a narrower pore-diameter distribution, because in order to obtain more outstanding fractionation performance, it is desirable that the difference be small between the mean flow pore diameter and the maximum pore diameter.

Despite the above description, the present inventor has found, after intensive study, that when the pore diameter is decreased considerably, the microporous PTFE membrane produced though the conventional process, such as the process stated in Patent Literature 2 or 3 or the like, has a tendency to broaden the pore-diameter distribution in a larger pore-diameter region, so that microscopic foreign particles cannot be removed at high removing efficiency (with sufficient fractionation performance). In addition, the present inventor has found that when the pore diameter is considerably small, the filtering flow rate (the amount of treatment) tends to become notably small, requiring a large-scale apparatus. In particular, in the case of a microporous membrane having a mean flow pore diameter of 30 nm or less, the dimension of a pore that has an opening at the surface is increased. As a result, the above-described problems become noticeable.

An object of the present invention is to offer a microporous fluororesin membrane that is a microporous membrane having a significantly small pore diameter and a narrow pore-diameter distribution and that can remove microscopic foreign particles at high efficiency when used as a filtration membrane. Another object of the present invention is to offer a porous-resin-membrane composite that combines the foregoing microporous membrane and a porous supporter and a production process of the composite and to offer a separation membrane element incorporating the foregoing porous-resin-membrane composite.

Solution to Problem

To solve the above-described problem, the present inventor has intensely studied and, as a result, has found that a membrane having a pore diameter as microscopic as 30 nm or less in mean flow pore diameter can be obtained through the following process. First, PTFE partially copolymerized with hexafluoropropylene or perfluoroalkyl ether (modified PTFE) is used as the material to produce a fine power. The fine powder is formed into the shape of a membrane. The formed membrane is heated to the melting point of the modified PTFE or above to bake the fine powder and then stretched. The present inventor also has found that the above-described process enables the production of a membrane having a narrow pore-diameter distribution even when the pore diameter is as significantly small as described above. Thus, the present invention has been accomplished.

A first aspect of the present invention is a microporous modified-PTFE membrane that is a microporous membrane produced by the following steps:

producing a copolymer of hexafluoropropylene or perfluoroalkyl ether and tetrafluoroethylene having the number of moles not less than 50 times that of the hexafluoropropylene or perfluoroalkyl ether;

forming the copolymer into the shape of a membrane;

heating the membrane to the melting point of the copolymer or above to bake the copolymer;

cooling the obtained baked product; and subsequently stretching the baked product.

The microporous modified-PTFE membrane has a mean flow pore diameter of 30 nm or less.

The above-described copolymer (modified PTFE) forming the microporous modified-PTFE membrane of the present invention is either a copolymer of hexafluoropropylene and tetrafluoroethylene having the number of moles not less than 50 times that of the hexafluoropropylene or a copolymer of perfluoroalkyl ether and tetrafluoroethylene having the number of moles not less than 50 times that of the perfluoroalkyl ether. The two copolymers are expressed respectively by structural formulas (I) and (II) shown below.

[Chemistry 1]

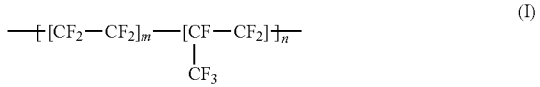
(I)

[Chemistry 2]

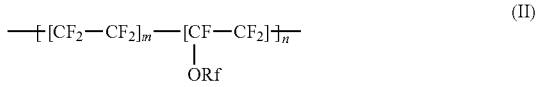
(II)

The letter "m" in the formulas represents a number not less than 50. Therefore, the monomer forming the foregoing copolymer is composed mainly of tetrafluoroethylene. The letter "n" represents the degree of polymerization. The range of "n" is not particularly limited, but a copolymer having a molecular weight of one million to 20 million is usually used. When the molecular weight is excessively high, the porosity tends to decrease. When the molecular weight is excessively low, the membrane has a tendency to develop pinholes, to become breakable at the time of the stretching, and the like. In addition, the expression "Rf" in formula (II) represents a perfluoroalkyl group. It is desirable that "Rf" be perfluoropropyl expressed as $C_3F_7$, in which the carbon number is three, or be perfluoromethyl expressed as $CF_3$, in which the carbon number is one.

The above-described copolymer forming the microporous modified-PTFE membrane of the present invention may be produced by copolymerizing another monomer in addition to hexafluoropropylene or perfluoroalkyl ether provided that the range of copolymerization does not impair the gist of the present invention. Furthermore, the foregoing copolymer may also be produced by copolymerizing both hexafluoropropylene and perfluoroalkyl ether.

Because the above-described copolymer has an "m" whose number is 50 or more and therefore is composed mainly of tetrafluoroetylene, its melting point is as relatively high as 320° C. or more and its melt viscosity is so high that melt extrusion cannot be performed. In consequence, the Copolymer is distinguished from FEP (a tetrafluoroethylen-hexafluoropropylene copolymer) and PFA (a tetrafluoroethylen-perfluoroalkyl ether copolymer), which are melt-extrudable thermoplastic resins.

Because the above-described copolymer has high melt viscosity that disables melt extrusion and renders it difficult to produce its solution, as the process to form the foregoing copolymer into the shape of a membrane, the following process can be conceived. First, a dispersion produced by dispersing a powder of the foregoing copolymer in a liquid (a dispersion medium) is applied onto a smooth plate to form a membrane. Then, the dispersion medium is evaporated to be removed.

The foregoing copolymer can be produced by a process in accordance with the known process for producing PTFE or the like. Nevertheless, the dispersion of the fine powder of the foregoing copolymer obtained through emulsion polymerization can be favorably used as a dispersion of a powder to be formed into the shape of a membrane. Consequently, the process employing emulsion polymerization is advantageous as the process for producing the foregoing copolymer.

After being formed into the shape of a membrane, the membrane is heated to the melting point of the foregoing copolymer or above. The heating bakes the powder of the foregoing copolymer to melt it. Thus, a nonporous modified-PTFE membrane is produced. The term "a nonporous fluororesin membrane" means a membrane almost free of pores passing through the membrane. More specifically, it is desirable that the membrane have a Gurley second of 5,000 seconds or more.

The nonporous fluororesin membrane obtained through the above-described process is stretched to become porous. Before performing the stretching, it is desirable that the membrane be annealed either through the process of increasing the temperature to the melting point of the modified PTFE or above and then gradually cooling it to the melting point or below or through the process of heating it for a certain time period at a temperature slightly lower than the melting point of the modified PTFE. The annealing can saturate the crystallinity of the fluororesin before the stretching. As a result, high porosity can be achieved and the production becomes possible at a higher reproducibility in pore diameter. The annealing can be performed through a process similar to that described in Patent Literature 2. When the crystallinity is increased, the quantity of heat of fusion is increased. Consequently, the degree of progress of annealing can be confirmed by measuring the quantity of heat of fusion.

Although, the stretching may be performed by either uniaxial stretching or biaxial stretching, it is desirable to perform biaxial stretching. The stretching forms pores in the fluororesin membrane. As the magnitude of stretching is increased, the pore diameter is increased and consequently the mean flow pore diameter, which expresses the dimension of the pore diameter, is increased. The stretching, therefore, is performed to the degree at which the desired mean flow pore diameter is achieved. Because the microporous modified- PTFE membrane of the present invention has a mean flow pore diameter of 30 nm or less, the stretching is performed such that the pore diameter does not exceed that range. It is desirable that the stretching be performed at a temperature of 80° C. or less, more desirably 30° C. or less.

The microporous modified-PTFE membrane of the present invention produced as described above has a feature in that it has a mean flow pore diameter of 30 nm or less. In consequence, it can be used as a filtration membrane (a filter) for filtering microscopic particles of 30 nm or less.

The microporous modified-PTFE membrane of the present invention obtained as described above has a narrow pore-diameter distribution and a small difference between the mean flow pore diameter and the maximum pore diameter. As a result, it can reliably remove microscopic particles, achieving high removing efficiency. Consequently, the use of the microporous modified-PTFE membrane of the present invention as a filtration membrane for removing microscopic particles enables the achievement of high efficiency in removing microscopic particles.

Among microporous modified-PTFE membranes of the present invention, the membrane that has almost no pores more than 300 nm in major axis when its surface is observed with SEM is desirable, because it achieves higher removing efficiency. A second aspect of the present invention is the microporous modified-PTFE membrane in the first aspect of the present invention in which a pore having a major axis of more than 300 nm is virtually not present. In the above description, the expression "virtually not present" means that the percentage of pores more than 300 nm in major axis is less than 10%.

A third aspect of the present invention is the microporous modified-PTFE membrane in the first or second aspect of the present invention in which the tetrafluoroethylene used for forming the copolymer has the number of moles not more than 400 times that of the hexafluoropropylene or perfluoroalkyl ether.

When the magnitude of "m" in formulas (I) and (II) described above is in excess of 400, the pore-diameter distribution tends to be broadened. Consequently, it is desirable that the magnitude be not more than 400. In other words, it is desirable that the magnitude of "m" fall within the range of 50 to 400. In addition, it is desirable that the foregoing copolymer (modified PTFE) have a quantity of heat of fusion in the range of 17 to 60 J/g, more desirably 20 to 45 J/g, preferably 23 to 35 J/g. When the quantity of heat of fusion is controlled to fall within the above-described range, the porosity can be further increased even when the mean flow pore diameter remains the same. The term "a quantity of heat of fusion" means a value measured by using a differential scanning calorimeter as described later.

A fourth aspect of the present invention is a porous-modified-PTFE-membrane composite that has the following components:
the microporous modified-PTFE membrane in any one of the first to third aspects of the present invention, and
a porous supporter bonded together with the above-described microporous modified-PTFE membrane.

The microporous modified-PTFE membrane of the present invention has pores that are microscopic and uniform in diameter and has few defects such as voids. Consequently, when it is used for filtering microscopic particles, it exhibits excellent features such as achieving high removing efficiency. Nevertheless, by bonding it together with a porous supporter, a porous-modified-PTFE-membrane composite having excellent mechanical strength in addition to the foregoing features can be produced. Furthermore, in comparison with the case where the microporous modified-PTFE membrane is used singly, the porous-modified-PTFE-membrane composite is easy in handling when it is used or processed. Consequently, the porous-modified-PTFE-membrane composite of the present invention can be favorably used as a filtration membrane for filtering microscopic particles.

The porous-modified-PTFE-membrane composite of the present invention can be obtained through the following process. First, a fluororesin composed mainly of modified PTFE is formed into the shape of a membrane. The membrane is heated to the melting point of the fluororesin or above to perform baking. Thus, a nonporous resin membrane is produced. The nonporous resin membrane is bonded together with a porous supporter to produce a porous-resin-membrane composite. Finally, the composite is stretched. The stretching operation also stretches the nonporous resin membrane, which forms the composite, to form a microporous-modified-PTFE-membrane. The foregoing stretching is much easier in handling in comparison with the case where the nonporous resin membrane is stretched singly, without combining with a porous supporter. In other words, although the handling at the time of the stretching is difficult when the nonporous resin membrane (a thin membrane) is used singly, the handling becomes easy when the nonporous resin membrane is combined with a porous supporter to form a composite.

The porous supporter is used to give mechanical strength to the composite of the present invention. When the composite is used as a filtration membrane, it is desired that the supporter do not impair the performance as the filtration membrane, such as a treating ability and treating rate. Consequently, as the porous supporter, a porous material made of PTFE, which has excellent mechanical strength, chemical resistance, and heat resistance, is favorably used. In addition, it is desired that the porous supporter not only have a pore diameter larger than that of the microporous modified-PTFE membrane to be combined with it but also have high porosity. More specifically, a porous supporter is favorably used that is a porous material made of PTFE produced by stretching a PTFE membrane in such a way as to form pores of 100 nm or more, desirably 200 nm or more, and that has a thickness capable of giving sufficient mechanical strength.

The bonding-together of the above-described nonporous resin membrane and porous supporter may be performed by using a thermoplastic resin having the melting point lower than that of PTFE, such as PFA, as an adhesive.

A fifth aspect of the present invention is a process of producing a porous-modified-PTFE-membrane composite. The process has the following steps:
a step 1 of forming a nonporous fluororesin membrane by applying, onto a smooth foil, a fluororesin dispersion produced through dispersing, into a dispersion medium, particles of a copolymer of hexafluoropropylene or perfluoroalkyl ether and tetrafluoroethylene having the number of moles not less than 50 times that of the hexafluoropropylene or perfluoroalkyl ether, subsequently, by evaporating the dispersion medium, and then by performing heating to the melting point of the copolymer or above to perform baking;
a step 2 of bonding a porous supporter together with the nonporous fluororesin membrane, the step 2 being performed after repeating the step 1 as necessary;
a step 3 of removing the smooth foil to obtain a composite composed of the nonporous fluororesin membrane and the porous supporter, the step 3 being performed after performing the step 2; and
a step 4 of stretching the composite.

The step 1 is a step of forming a nonporous fluororesin membrane bonded together with a smooth foil by applying (casting) a dispersion of the above-described copolymer onto the smooth foil and then by performing evaporating and baking operations. The process can remarkably suppress the formation of defects such as voids in the nonporous fluororesin membrane. In addition, the use of this process (casting process) can produce a homogeneous microporous membrane, because the membrane is free from orientation, is isotropic, and is homogeneous and because the membrane does not contract or deform at the time of the stretching. In the step 1, the formation of the nonporous fluororesin membrane is repeated twice or more as necessary.

The step 2 is a step of bonding a porous supporter together with the nonporous fluororesin membrane (the nonporous fluororesin membrane at the outermost later when the step 1 is repeated) formed on the smooth foil. As the porous supporter, a porous material made of PTFE produced by stretching PTFE is favorably used. This bonding of the two members together may be performed by using a thermoplastic resin having the melting point lower than that of the foregoing copolymer, such as PFA, as an adhesive.

After the step 2, the step 3 is performed that removes the smooth foil covering the nonporous fluororesin membrane. Although the removing method is not particularly limited, when a metal foil is used as the smooth foil, a method that removes it by dissolving it with an acid or the like can be shown as an example.

By removing the smooth foil, a composite having, on the porous supporter, a nonporous resin membrane made of modified-PTFE can be obtained. The step 4 is a step of stretching the composite. In addition, as described above, the annealing before the stretching can saturate the crystallinity of the fluororesin before the stretching. As a result, high porosity can be achieved, so that the production becomes possible at a higher reproducibility in pore diameter, which is desirable.

A sixth aspect of the present invention is a separation membrane element that has, as a separation membrane, the porous-modified-PTFE-membrane composite in the fourth aspect of the present invention. The microporous modified-PTFE membrane forming the porous-modified-PTFE-membrane composite in the fourth aspect of the present invention has a narrow pore-diameter distribution and pores with a uniform diameter. Consequently, the separation membrane element that has the foregoing composite as a separation membrane (a filter) can perform the filtration of a treatment-undergoing liquid containing microscopic particles (raw water to be filtration-treated) at high removing efficiency.

Advantageous Effects of Invention

The microporous modified-PTFE membrane of the present invention has not only a pore diameter as microscopic as 30 nm or less in mean flow pore diameter but also a narrow pore-diameter distribution. Consequently, the use of the membrane as a filtration membrane for removing microscopic particles can achieve high removing efficiency even for microscopic particles having a diameter of 30 nm or less. In consequence, both the porous-modified-PTFE-membrane composite of the present invention having the above-described microporous membrane as a constituent element and the separation membrane element of the present invention having the foregoing porous-modified-PTFE-membrane composite as a separation membrane can accomplish high efficiency in removing microscopic particles. In addition, the porous-modified-PTFE-membrane composite of the present invention can be easily produced through the production process of the present invention.

DESCRIPTION OF EMBODIMENTS

Figure 1:
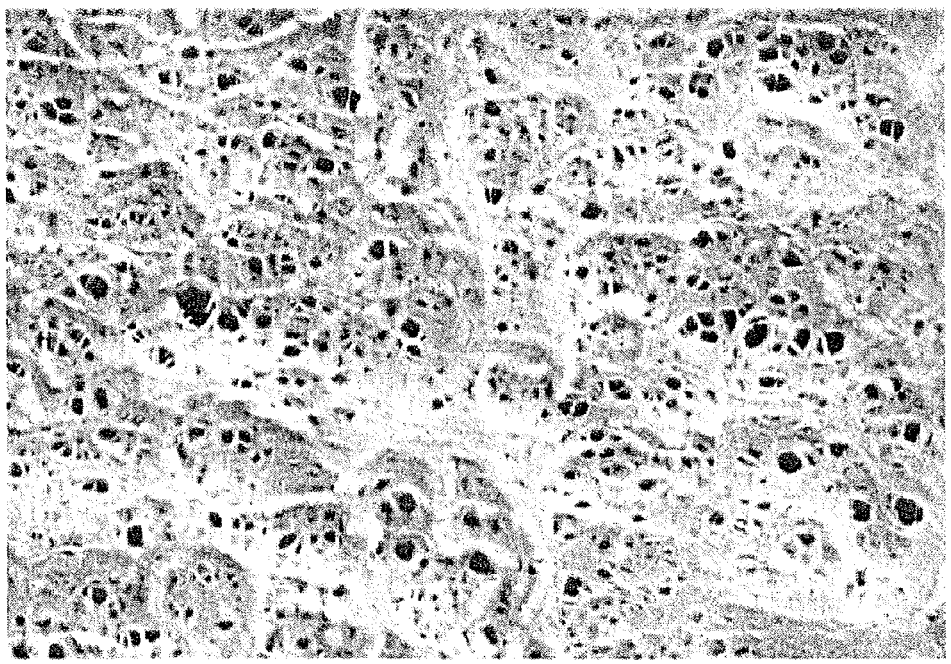
FIG. 1 is an SEM photograph of the porous-modified-PTFE-membrane composite obtained in Example 1.

Next, an explanation is given to concrete embodiments of the present invention. The present invention is not limited to the embodiments described below.

It is desirable that the modified-PTFE to be used as the material be selected from the modified-PTFE having a quantity of heat of fusion in the range of 17 to 60 J/g. It is more desirable that the modified-PTFE have a quantity of heat of fusion in the range of 20 to 45 J/g. The quantity of heat of fusion is measured by using a heat-flux differential scanning calorimeter and through a method as shown in Example described below.

The quantity of heat of fusion of the modified PTFE forming the macroporous modified-PTFE membrane of the present invention can be controlled through a method such as the adjusting of the molecular weight or the partial changing of the ratio of copolymerization (the degree of modification) of the hexafluoropropylene, perfluoroalkyl ether, or the like. When the molecular weight is decreased, the quantity of heat of fusion is increased. Inversely, when the molecular weight is increased, the quantity of heat of fusion is decreased. Furthermore, when the degree of modification is increased, the quantity of heat of fusion is decreased. The adjusting of the molecular weight of the modified PTFE is usually carried out by adjusting the condition for the polymerization of the material. The adjusting, however, may be performed by irradiating the material or formed product with ionizing radiation.

The membrane of the fluororesin can be produced through processes shown below.

(1) This process is performed as described below. First, particle latex (particle diameter: 150 to 350 nm) is produced by emulsion polymerization of hexafluoropropylene or perfluoroalkyl ether and tetrafluoroethylene having the number of moles not less than 50 times that of the hexafluoropropylene or perfluoroalkyl ether. The particle latex undergoes coagulation, drying, and granulation to produce a powder (a modified-PTFE fine powder; diameter: 300 to 600 μm). After an extrusion aid is added to the powder, the powder is paste-extruded in the form of a sheet or tube and subsequently rolled as necessary. This process can decrease the thickness of the membrane (the formed product) to 20 μm or so.

(2) This process is performed as described below. First, a powder (a modified-PTFE molding powder) is produced by suspension polymerization of hexafluoropropylene or perfluoroalkyl ether and tetrafluoroethylene having the number of moles not less than 50 times that of the hexafluoropropylene or perfluoroalkyl ether. The powder is formed into the shape of a hollow cylinder by compression molding. The hollow-cylindrical product is baked at a temperature not lower than the melting point to obtain a formed product. While being rotated, the formed product is cut to produce a thin film of 20 μm or so.

(3) This process is performed as described below. First, a modified-PTFE dispersion is produced by emulsion polymerization or the like of hexafluoropropylene or perfluoroalkyl ether and tetrafluoroethylene having the number of moles not less than 50 times that of the hexafluoropropylene or perfluoroalkyl ether. The dispersion is applied onto a smooth foil. The dispersion medium is evaporated. Then, heating is conducted to the melting point of the polymer or above to perform baking. (This process is the step 1 of the fifth aspect of the present invention.) The employment of this process enables not only a decrease in the thickness of the membrane to 5 μm or less but also a further increase in the filtration rate and treatment efficiency when used as a filtration membrane, which is desirable.

The fluororesin dispersion used in the fifth aspect of the present invention is a product formed by dispersing a fluororesin powder made of modified PTFE into a dispersion medium. As described above, it can be produced by emulsion polymerization of hexafluoropropylene or perfluoroalkyl ether and tetrafluoroethylene. For example, a mixture of hexafluoropropylene or perfluoroalkyl ether and tetrafluoroethylene having the number of moles not less than 50 times that of the hexafluoropropylene or perfluoroalkyl ether is emulsion-polymerized to obtain a latex having a primary-particle diameter of about 150 to 350 nm. By concentrating the latex, a dispersion of a fine powder of modified PTFE can be obtained.

As the dispersion medium, an aqueous-based medium such as water is usually used. It is desirable that the content of fluororesin powder in the fluororesin dispersion fall within the range of 20 to 70 wt %. It is desirable that the fluororesin dispersion further contain a nonionic water-soluble polymer having a molecular weight of 10,000 or more, because without affecting the dispersing of the fluororesin dispersion, the polymer gelatinizes at the time of the evaporation of the water to form a film, so that a thin fluororesin membrane having fewer defects can be obtained. The types of nonionic water-soluble polymer having a molecular weight of 10,000 or more include polyethylene oxide and polyvinyl alcohol.

The smooth foil to be used in the fifth aspect of the present invention is a smooth film having no observable pit or asperity at the surface to be brought into contact with the fluororesin dispersion. It is desirable that the smooth foil be a metal foil that has flexibility and that can be easily removed through dissolution using an acid or the like after the membrane is formed. Of the metal foils, an aluminum foil is particularly favorable because it has flexibility, is easily removed through dissolution, and is easily available.

Although the range of the thickness of the smooth foil is not particularly limited, it is desirable to employ a thickness that can give flexibility so that the operation for placing the foil onto the base material can be performed easily. Furthermore, it is desirable that the thickness be such that when the smooth foil is removed after the membrane is formed, the thickness does not render the removal difficult. For example, when the smooth foil is removed through dissolution, it is desired that the thickness be such that it facilitates the removal through dissolution.

In the fifth aspect of the present invention, after the casting is performed through, for example, a process that simply applies the fluororesin dispersion onto a smooth foil, the dispersion medium is evaporated. The evaporation can be carried out by heating the applied dispersion either to a temperature close to the boiling point of the dispersion medium or to the boiling point of the dispersion medium or above. This evaporation forms a film composed of a fluororesin powder consisting mainly of PTFE. By heating the film to the melting point of the fluororesin or above to perform baking, a nonporous fluororesin membrane can be obtained. The heating for evaporation and baking may be conducted in the same stage.

The stretching of the composite having the nonporous fluororesin membrane can be carried out by using the apparatus that is used when the conventional stretched PTFE is produced and under the condition similar to that for the foregoing PTFE. It is desirable that the stretching be performed at a temperature of 80° C. or less, more desirably 30° C. or less, preferably 15° C. or less. When the casting process is employed for the formation of the fluororesin membrane, the membrane is free from orientation, is isotropic, and is homogeneous. In addition, the membrane does not contract or deform at the time of the stretching. As a result, a homogeneous porous fluororesin membrane can be obtained.

EXAMPLE

First, description is made on the method for measuring the quantity of heat of fusion, air permeability (Gurley second), and mean flow diameter in Examples and Comparative examples.

[Method for Measuring the Quantity of Heat of Fusion]

The measurement is conducted by using a heat-flux differential scanning calorimeter (Heat-flux differential scanning calorimeter DSC-50 made by Shimadzu Seisakusho, Ltd.) through the method described below.

A sample of 10 to 20 ing is heated from room temperature to 245° C. at a rate of 50° C./min and subsequently to 365° C. at a rate of 10° C./min (a first step). Then, it is cooled to 350° C. at a rate of –10° C./min and is maintained for 5 minutes at 350° C. Subsequently, it is cooled from 350° C. to 330° C. at a rate of –10° C./min and from 330° C. to 305° C. at a rate of –1° C./min (a second step). Next, after being cooled from 305° C. to 245° C. at a rate of –50° C./min, it is heated from 245° C. to 365° C. at a rate of 10° C./min (a third step). The sampling time is 0.5 seconds for each sampling. The amount of absorbed heat in the first step is obtained by integrating the section from 303° C. to 353° C. The amount of generated heat in the second step is obtained by integrating the section from 318° C. to 309° C. The amount of absorbed heat in the third step is obtained by integrating the section of 48° C. starting from the end point of the endothermic curve. The amount of absorbed heat in the third step is defined as the quantity of heat of fusion.

[Method for Measuring the Air Permeability (Gurley Second)]

The measurement was performed by using an Oken-type air-permeability measuring device (made by Asahi Seiko Co., Ltd.) having the same structure as that of the Gurley air permeability tester stipulated in JIS P 8117 (Air permeability test method for paper and paperboard). The test result is shown by Gurley second.

[Method for Measuring the Mean Flow Diameter]

The measurement was performed by using a micropore distribution measuring instrument (Palm Porometer CFP-1500A made by Porous Materials, Inc.) and by using GAL-WICK (propylene, 1,1,2,3,3,3-oxidized hexahydrofluoric acid made by Porous Materials, Inc.) as a liquid. More specifically, the diameter can be obtained through the following method. First, the relationship between the pressure difference applied to the membrane and the rate of air flow passing through the membrane is measured both in the case where the membrane is dry and in the case where the membrane is wet with the liquid. The obtained two graphs are defined as a dry curve and a wet curve, respectively. The pressure difference at the intersection point of the wet curve and the curve drawn by halving the flow rate in the dry curve is denoted as P (Pa). The mean flow diameter is obtained by the following equation:

Mean flow diameter $d$ (μm)=$c\gamma/P$, where c is a constant of 2,860 and
$\gamma$ is a surface tension of the liquid (dynes/cm).

Example 1

Preparation of Dispersion

The following three materials were used:
an aqueous-based dispersion (solid content: about 55%) of modified-PTFE having absorption of perfluoroalkyl ether by Infrared Absorption Spectrometry, having an "m" of 283, and having a quantity of heat of fusion (the amount of absorbed heat in the above-described third step) of 23.1 J/g;
PFA dispersion 920HP (made by Du Pont-Mitsui Fluorochemicals Company, Ltd.); and
MFA latex D5010 (This is made by Solvay Solexis S.p.a. This is a latex of PFA different from the PFA of PFA dispersion 920HP. Hereinafter, this PFA in the latex is referred to as MFA).

By using the foregoing materials, a fluororesin dispersion was prepared in which MFA/(modified-PTFE+MFA+PFA) (volume ratio) was 2% and PFA/(modified-PTFE+MFA+PFA) (volume ratio) was 2%. Finally, polyethylene oxide having a molecular weight of two million was added to the foregoing fluororesin dispersion such that the polyethylene oxide content became 0.003 g/ml.

Next, an aluminum foil having a thickness of 50 nm was spread on a flat glass plate such that wrinkles were not formed, and the foil was fixed to the plate. After the fluororesin dispersion prepared as described above was dropped onto the foil, the fluororesin dispersion was uniformly spread across the aluminum foil by moving a stainless steel slide shaft (an SNSF-type stainless steel fine shaft; outer diameter: 20 mm) made by Nippon Bearing Co., Ltd. in such a way as to slide it. After the foil was subjected to the steps of drying for 60 minutes at 80° C., heating for one hour at 250° C., and heating for one hour at 340° C., it was cooled by itself to form a thin fluororesin membrane (a nonporous modified-PTFE membrane) fixed on the aluminum foil. The foregoing thin fluororesin membrane had an average thickness of about 1.6 μm, which was calculated by using both the absolute specific gravity of fluororesin (2.25 g/cm³) and the difference in weight of aluminum foil per unit area between the aluminum foil before the thin fluororesin membrane was formed and the aluminum foil after the thin fluororesin membrane was formed.

Subsequently, to a PFA dispersion produced by diluting 920HP by using distilled water so as to increase the volume fourfold, polyethylene oxide having a molecular weight of two million was added such that its content became 0.003 g/ml to prepare a PFA dispersion of fourfold dilution.

[Production of Test Sample]

The aluminum foil on which the thin fluororesin membrane was fixed was spread, with the membrane side up, on a flat glass plate such that wrinkles were not formed, and the foil was fixed to the plate. After the PFA dispersion of fourfold dilution was dropped onto the thin fluororesin membrane, the PFA dispersion of fourfold dilution was uniformly spread across the surface of the membrane by moving the same stainless steel slide shaft made by Nippon Bearing Co., Ltd. as that of the above description in such a way as to slide it. During the spreading operation, while the water still remains, a stretched-PTFE porous material having a nominal pore diameter of 0.45 μm and a thickness of 80 μm (made by Sumitomo Electric Fine Polymer, Inc.; trade name: POREFLON FP-045-80; mean flow pore diameter: 0.173 μm; porosity: 74%; Gurley second: 10.7 seconds) was placed on the dispersion.

Subsequently, after the foregoing product was subjected to the steps of drying for 60 minutes at 80° C., heating for one hour at 250° C., heating for one hour at 320° C., and heating for ten hours at 317.5° C., it was cooled by itself to form a composite in which the stretched-PTFE porous material was bonded, through the thermoplastic PFA having a melting point lower than that of PTFE, with the thin fluororesin membrane on which the aluminum foil was fixed. Then, the aluminum foil was removed by dissolving it with hydrochloric acid to obtain a test sample. The test sample had a Gurley second of 5,000 seconds or more. When ethanol was brought into contact with the thin fluororesin membrane at room temperature, there existed no pores that allowed the penetration of it. This test revealed that the test sample was a fluororesin composite including a virtually nonporous thin fluororesin membrane preventing ethanol from penetrating it.

[Stretching]

Subsequently, by using a specially produced transverse stretching machine and under the conditions of an inlet chuck width of 230 mm, an outlet of 690 mm, a stretching-zone length of 1 m, a line speed of 6 m/min, and 25° C., a threefold stretching was performed to obtain a sample membrane. When measured by using the reagent GALWICK (propylene, 1,1,2,3,3,3-oxidized hexahydrofluoric acid made by Porous Materials, Inc.), the mean flow pore diameter of the sample membrane was smaller than the measurement limit 20 nm.

FIG. 1 shows an SEM photograph of this sample membrane.

Example 2

Figure 2:
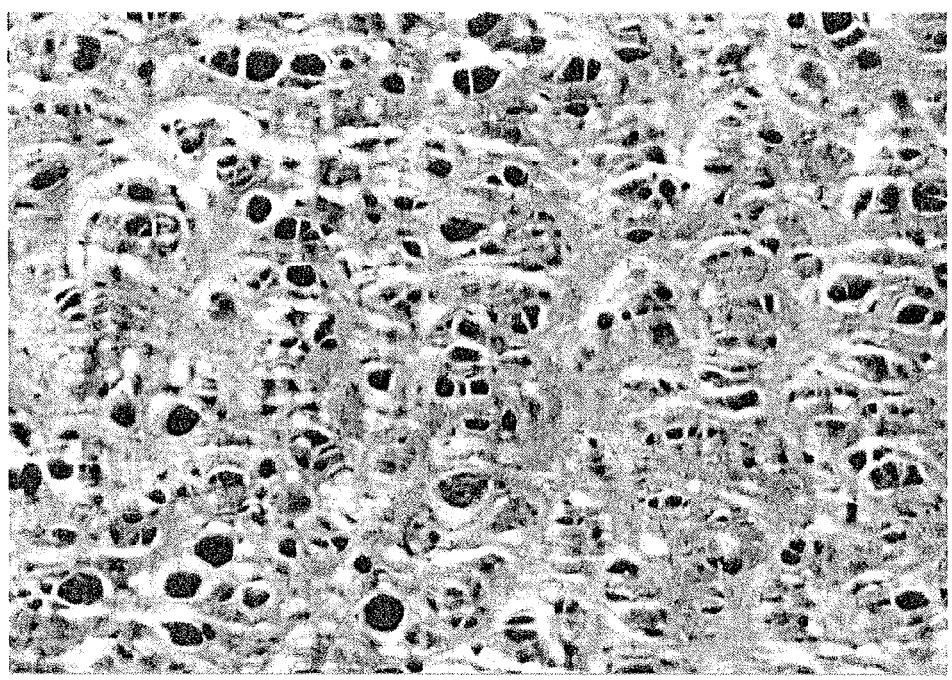
FIG. 2 is an SEM photograph of the porous-modified-PTFE-membrane composite obtained in Example 2.

A sample membrane was produced by using the same process as used in Example 1 except that in place of the aqueous-based dispersion of modified PTFE used in Example 1, an aqueous-based dispersion (solid content: about 55%) of modified PTFE having absorption of hexafluoropropylene by Infrared Absorption Spectrometry, having an "m" of 148, and having a quantity of heat of fusion of 31.0 J/g was used. When measured by using the reagent GALWICK (propylene, 1,1,2,3,3,3-oxidized hexahydrofluoric acid made by Porous Materials, Inc.), the mean flow pore diameter of the sample membrane was smaller than the measurement limit 20 nm. FIG. 2 shows an SEM photograph of this sample membrane.

Example 3

Figure 3:
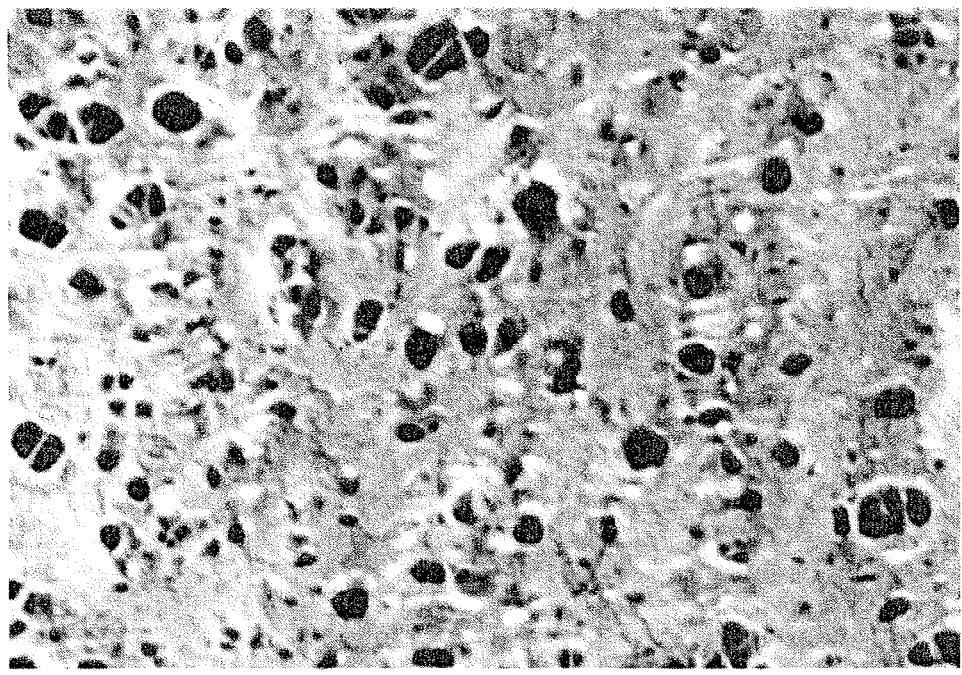
FIG. 3 is an SEM photograph of the porous-modified-PTFE-membrane composite obtained in Example 3.

A sample membrane was produced by using the same process as used in Example 1 except that in place of the aqueous-based dispersion of modified PTFE used in Example 1, an aqueous-based dispersion (solid content: about 55%) of modified PTFE having absorption of perfluoroalkyl ether by Infrared Absorption Spectrometry, having an "m" of 399, and having a quantity of heat of fusion of 30.9 J/g was used. When measured by using the reagent GALWICK (propylene, 1,1,2,3,3,3-oxidized hexahydrofluoric acid made by Porous Materials, Inc.), the mean flow pore diameter of the sample membrane was smaller than the measurement limit 20 nm. FIG. 3 shows an SEM photograph of this sample membrane.

Comparative Example 1

Figure 4:
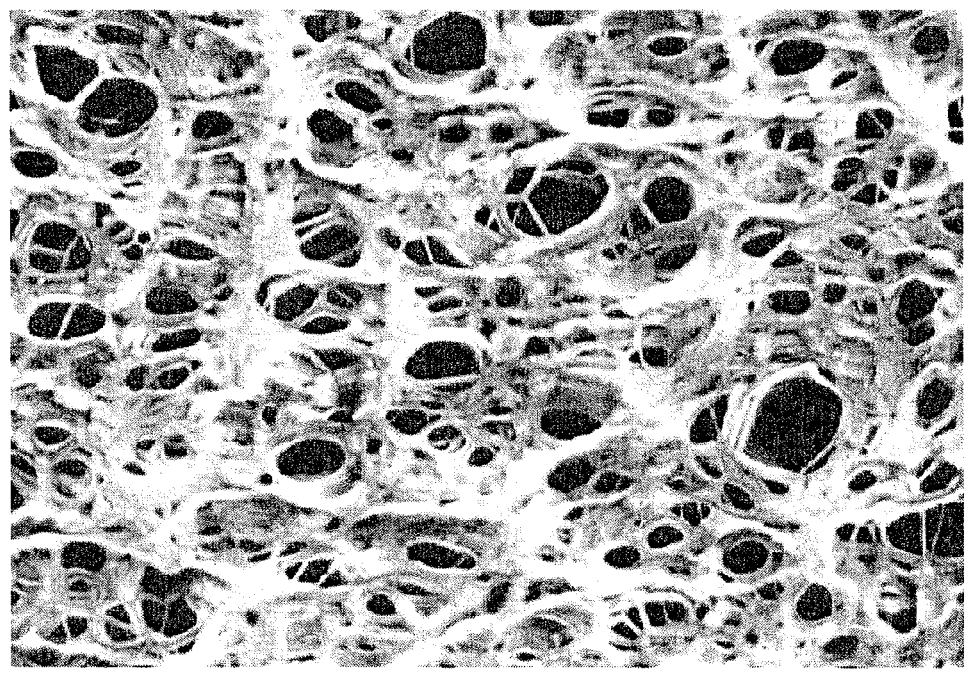
FIG. 4 is an SEM photograph of the porous-modified-PTFE-membrane composite obtained in Comparative example 1.

A sample membrane was produced by using the same process as used in Example 1 except that in place of the aqueous-based dispersion of modified PTFE used in Example 1, the aqueous-based dispersion 34JR (made by Du Pont-Mitsui Fluorochemicals Company, Ltd.; solid content: about 55%) of the homopolymer PTFE (quantity of heat of fusion: 53.4 J/g) was used. When measured by using the reagent GALWICK (propylene, 1,1,2,3,3,3-oxidized hexahydrofluoric acid made by Porous Materials, Inc.), the mean flow pore diameter of the sample membrane was 65 nm. FIG. 4 shows an SEM photograph of this sample membrane.

Comparative Example 2

Figure 5:
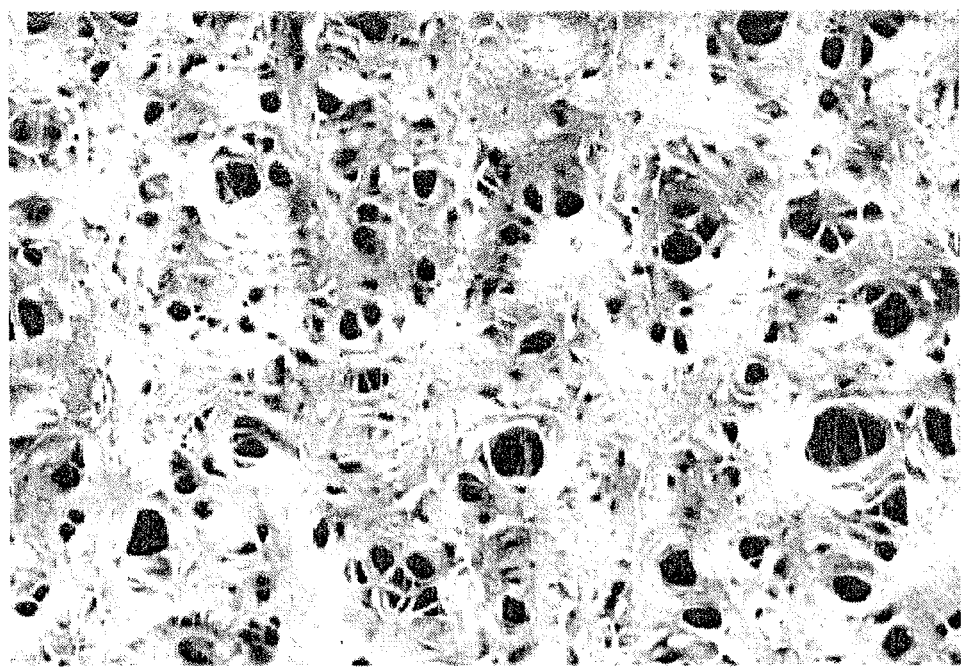
FIG. 5 is an SEM photograph of the porous-modified-PTFE-membrane composite obtained in Comparative example 2.

A sample membrane was produced by using the same process as used in Example 1 except that in place of the aqueous-based dispersion of modified PTFE used in Example 1, the aqueous-based dispersion 31JR (made by Du Pont-Mitsui Fluorochemicals Company, Ltd.; solid content: about 55%) of the homopolymer PTFE (quantity of heat of fusion: 34.9 J/g) was used. When measured by using the reagent GALWICK (propylene, 1,1,2,3,3,3-oxidized hexahydrofluoric acid made by Porous Materials, Inc.), the mean flow pore diameter of the sample membrane was 38 nm. FIG. 5 shows an SEM photograph of this sample membrane.

Comparative Example 3

Figure 6:
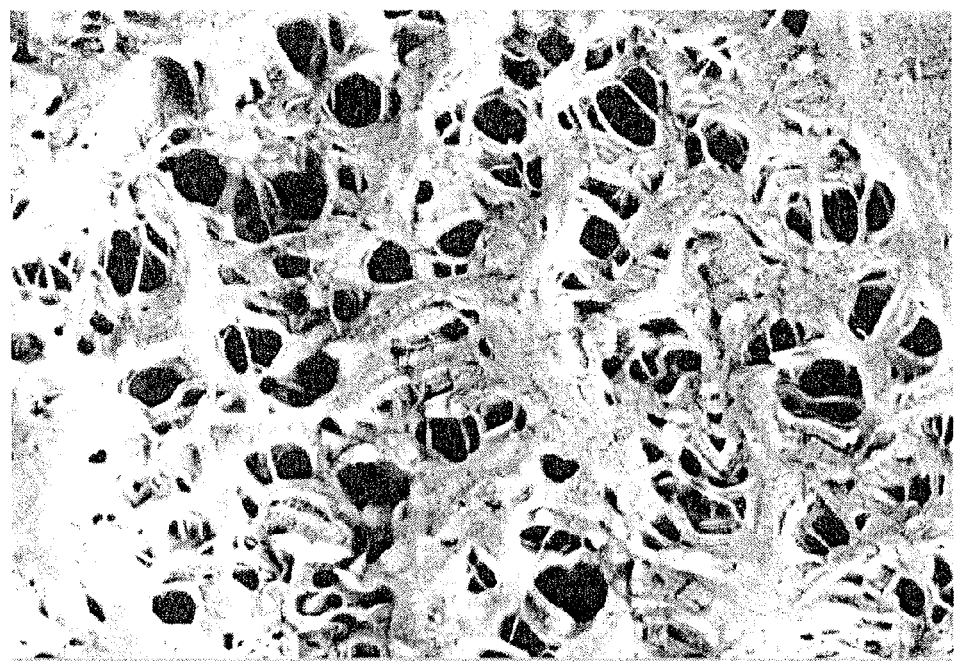
FIG. 6 is an SEM photograph of the porous-modified-PTFE-membrane composite obtained in Comparative example 3.

A sample membrane was produced by using the same process as used in Example 1 except that in place of the aqueous-based dispersion of modified PTFE used in Example 1, an aqueous-based dispersion of the homopolymer PTFE (quantity of heat of fusion: 30.02 J/g) was used. When measured by using the reagent GALWICK (propylene, 1,1,2,3,3,3-oxidized hexahydrofluoric acid made by Porous Materials, Inc.), the mean flow pore diameter of the sample membrane was less than 20 nm. FIG. 6 shows an SEM photograph of this sample membrane.

TABLE I

| | Example 1 | Example 2 | Example 3 | Comparative Example 1 | Comparative Example 2 | Comparative Example 3 |
|---|---|---|---|---|---|---|
| Modification type* | PFA | FEP | PFA | | Homopolymer | |
| Modification ratio "m"** | 283 | 148 | 399 | — | — | — |
| Primary-particle diameter (μm) | 0.253 | 0.244 | 0.25 | 0.25 | 0.238 | 0.25 |
| First step: melting point (° C.) | 345.6 | 340.3 | 339 | 336.5 | 340 | 347.7 |
| First step: quantity of heat of fusion (J/g) | 65.08 | 71.95 | 66.8 | 69.8 | 69.8 | 68.96 |
| Third step: melting point (° C.) | 324.3 | 331.1 | 327.5 | 331 | 330.7 | 329.6 |
| Third step: quantity of heat of fusion (J/g) | 23.05 | 31.04 | 30.09 | 53.4 | 34.9 | 30.02 |
| Mean flow pore diameter (nm) | <20 | <20 | <20 | 65 | 38 | <20 |
| Uniformity of pore diameter*** | Good | Good | Average | Poor | Poor | Poor |

*PFA indicates modification by perfluoroalkyl ether, and FEP indicates modification by hexafluoropropylene.
**The value of "m" in formulas (I) and (II) described earlier is indicated.
***The uniformity of pore diameter is evaluated by using an SEM photograph, and the result is indicated by the following criteria:
Good: Almost no pores having a major axis of more than 200 nm are found.
Average: Although pores having a major axis of more than 200 nm are found here and there, almost no pores having a major axis of more than 300 nm are found.
Poor: Pores having a major axis of more than 300 nm are found here and there.

The result shown in Table I and SEM photographs shown in FIGS. 1 to 6 reveal that in the examples of the present invention (Examples 1 to 3) obtained by using modified PTFE that is formed by partially copolymerizing perfluoroalkyl ether or hexafluoropropylene; the mean flow pore diameter is small (less than 20 nm), the pore-diameter distribution is narrow, and among pores that have an opening at the surface, almost no pores having a diameter of more than 300 nm are found. Nevertheless, because in Example 3, which has an "m" of 399, openings having a large dimension begin to develop, the evaluation result unveils that it is desirable to employ an "m" of 400 or less.

On the other hand, in Comparative examples 1 to 3, which are obtained by using homopolymer-type PTFE, the mean flow pore diameter is larger than that of Examples. In Comparative examples, when the quantity of heat of fusion is decreased, the pore diameter tends to decrease. Nevertheless, in any of Comparative examples (even in the case where the pore diameter is small); pores (the pores that have an opening at the surface) having a major axis of more than 300 nm are found here and there, and the distribution of the pore diameter is broad. In other words, the production of a membrane having a small pore diameter entails the broadening of the distribution of the pore diameter. As a result, it is likely that the efficiency in removing microscopic particles becomes insufficient.

The invention claimed is:

1. A microporous modified-polytetrafluoroethylene membrane, being a microporous membrane produced by the steps of:
   producing a copolymer of hexafluoropropylene or perfluoroalkyl ether and tetrafluoroethylene having the number of moles not less than 100 times that of the hexafluoropropylene or perfluoroalkyl ether;
   forming the copolymer into the shape of a membrane;
   heating the membrane to the melting point of the copolymer or above to bake the copolymer;
   cooling the obtained baked product, the baked product having a Gurley second of 5,000 seconds or more before stretching; and
   subsequently stretching the baked product;
   the microporous modified-polytetrafluoroethylene membrane having a mean flow pore diameter of 30 nm or less.

2. The microporous modified-polytetrafluoroethylene membrane as defined by claim 1, wherein a pore having a major axis of more than 300 nm is virtually not present.

3. The microporous modified-polytetrafluoroethylene membrane as defined by claim 1, wherein the tetrafluoroethylene used for forming the copolymer has the number of moles not more than 400 times that of the hexafluoropropylene or perfluoroalkyl ether.

4. A porous-modified-polytetrafluoroethylene-membrane composite, comprising;
   the microporous modified-polytetrafluoroethylene membrane as defined by claim 1; and
   a porous supporter bonded together with the above-described microporous modified-polytetrafluoroethylene membrane.

5. A process of producing a porous-modified-polytetrafluoroethylene-membrane composite, the process comprising:
   a step 1 of forming a nonporous fluororesin membrane by applying, onto a smooth foil, a fluororesin dispersion produced through dispersing, into a dispersion medium, particles of a copolymer of hexafluoropropylene or perfluoroalkyl ether and tetrafluoroethylene having the number of moles not less than 50 times that of the hexafluoropropylene or perfluoroalkyl ether, subsequently by evaporating the dispersion medium, and then by performing heating to the melting point of the copolymer or above to perform baking;
   a step 2 of bonding a porous supporter together with the nonporous fluororesin membrane, the step 2 being performed after repeating the step 1 as necessary;
   a step 3 of removing the smooth foil to obtain a composite composed of the nonporous fluororesin membrane and the porous supporter, the step 3 being performed after performing the step 2; and
   a step 4 of stretching the composite.

6. A separation membrane element, comprising, as a separation membrane, the porous-modified-polytetrafluoroethylene-membrane composite as defined by claim 4.

* * * * *